United States Patent
Chen

(10) Patent No.: US 8,382,367 B2
(45) Date of Patent: Feb. 26, 2013

(54) PROBE FOR AN EAR THERMOMETER

(75) Inventor: Kun-Sung Chen, Hsi-Chih (TW)

(73) Assignee: Digio2 International Co., Ltd., Miaoli (TW)

( * ) Notice: Subject to any disclaimer, the term of this patent is extended or adjusted under 35 U.S.C. 154(b) by 329 days.

(21) Appl. No.: 12/902,946

(22) Filed: Oct. 12, 2010

(65) Prior Publication Data
US 2012/0087391 A1    Apr. 12, 2012

(51) Int. Cl.
*G01J 5/04* (2006.01)
*G01J 5/08* (2006.01)

(52) U.S. Cl. ......... 374/121; 374/161; 374/208; 600/549

(58) Field of Classification Search ............... 374/161, 374/162, 121, 131–132, 163, 208; 600/474, 600/549
See application file for complete search history.

(56) References Cited

U.S. PATENT DOCUMENTS

| | | | |
|---|---|---|---|
| 6,450,970 B1* | 9/2002 | Mahler et al. | 600/549 |
| 6,886,979 B2* | 5/2005 | Conforti | 374/208 |
| 7,484,884 B2* | 2/2009 | Lane et al. | 374/121 |
| 7,854,550 B2* | 12/2010 | Chan et al. | 374/208 |
| 2009/0016404 A1* | 1/2009 | Wang et al. | 374/141 |
| 2011/0304471 A1* | 12/2011 | Ko et al. | 340/664 |
| 2012/0150482 A1* | 6/2012 | Yildizyan et al. | 702/131 |

* cited by examiner

*Primary Examiner* — Gail Verbitsky
(74) *Attorney, Agent, or Firm* — Hershkovitz & Associates, LLC; Abraham Hershkovitz

(57) ABSTRACT

A probe for an ear thermometer has a mounting bracket, a light module, a temperature sensor and a probe tube. The light module and temperature sensor is mounted on the mounting bracket. The light module is capable of radiating different colored lights to respectively indicate normal or abnormal body temperature. The probe tube covers the light module and temperature sensor and is light-pervious. Because the probe of the ear thermometer indicates the body temperature by different colored lights and/or numerals, using the ear thermometer with the probe is easy, simple and instinctive when compared to conventional thermometers that use LCD display to show numerical values.

14 Claims, 9 Drawing Sheets

US 8,382,367 B2

PROBE FOR AN EAR THERMOMETER

BACKGROUND OF THE INVENTION

1. Field of the Invention

The present invention relates to a probe, and more particularly to a probe for an ear thermometer that indicates normal and abnormal body temperatures with different colored lights and/or numerical values.

2. Description of Related Art

Thermometers such as mouth thermometers, rectal thermometers and ear thermometers are used for measuring human body temperature, with the head of the thermometer being inserted either into the mouth, or into the rectum or into the ear canal.

A conventional ear thermometer has a body, a head, a temperature sensor and a display. The head is mounted on the body. The temperature sensor is mounted in the head. The display may be a LCD display, is connected to the sensor and is capable of indicating numerals of temperature.

To overcome the shortcomings, the present invention provides a probe for an ear thermometer to mitigate or obviate the aforementioned problems.

SUMMARY OF THE INVENTION

The main objective of the invention is to provide a probe for an ear thermometer that indicates normal and abnormal body temperatures with different colored lights and/or numerical values.

A probe for an ear thermometer in accordance with the present invention has a mounting bracket, a light module, a temperature sensor and a probe tube. The light module and temperature sensor is mounted on the mounting bracket. The light module is capable of radiating different colored lights to respectively indicate normal or abnormal body temperature. The probe tube covers the light module and temperature sensor and is light-pervious. Because the probe of the ear thermometer indicates the body temperature by different colored lights and/or numerals, using the ear thermometer with the probe is easy, simple and instinctive when compared to conventional thermometers that use LCD display to show numerical values.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
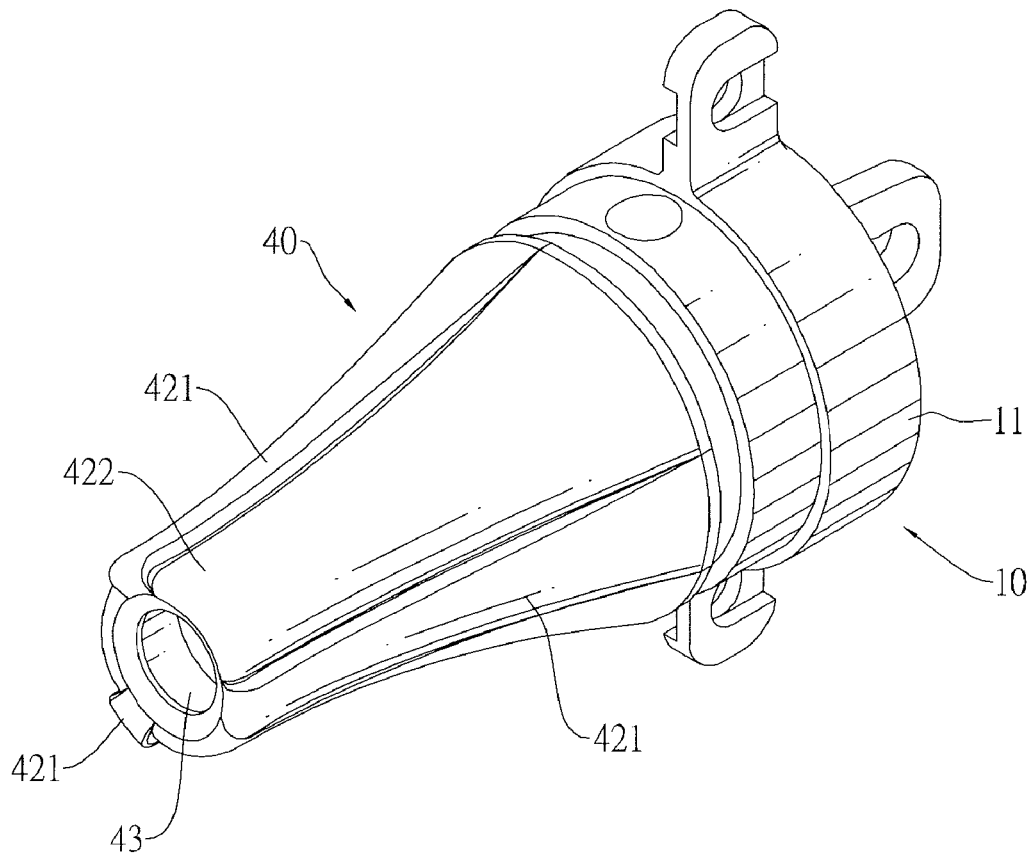
FIG. 1 is a perspective view of a first embodiment of a probe for an ear thermometer in accordance with the present invention.
Figure 2:
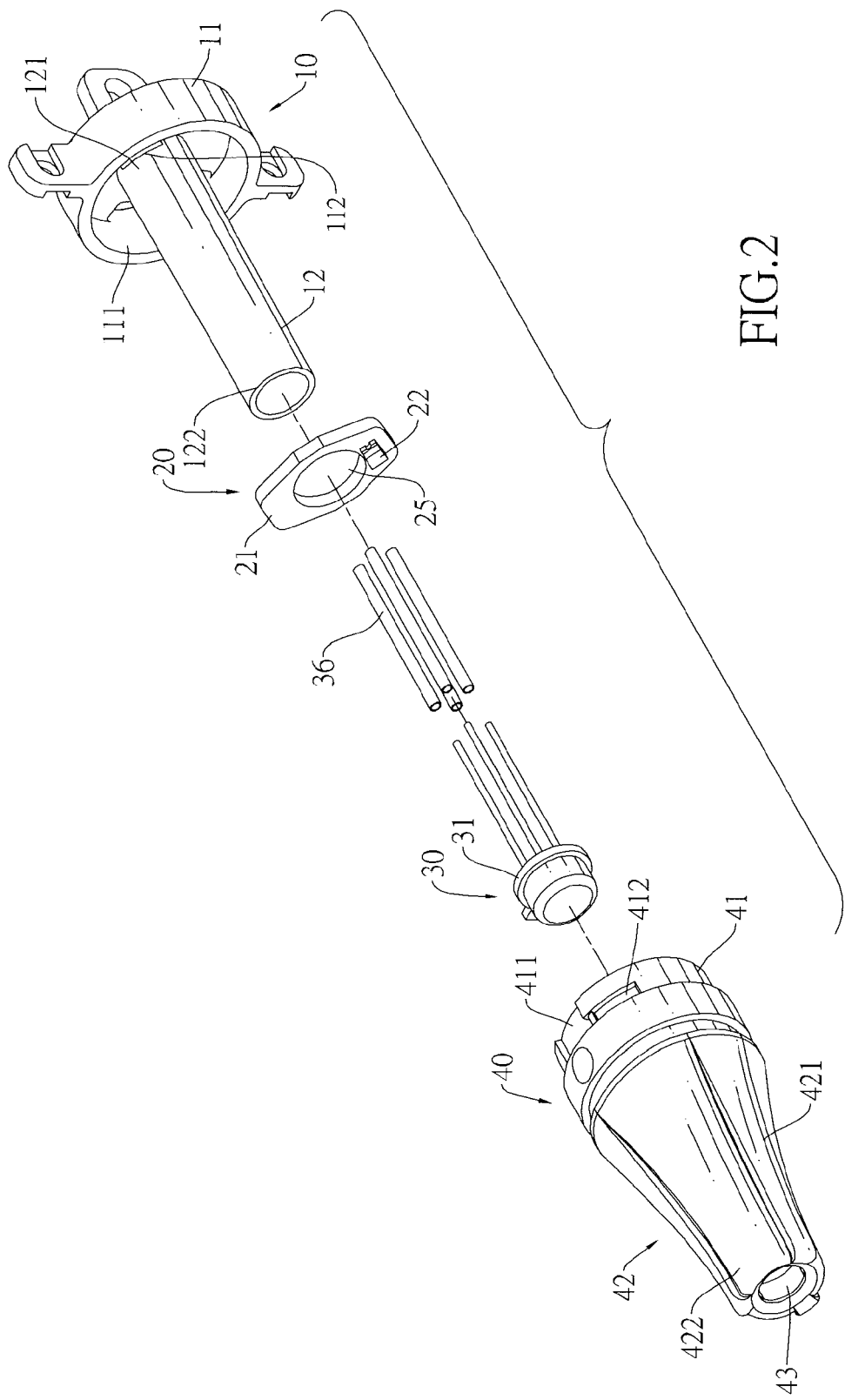
FIG. 2 is an exploded perspective view of the probe in FIG. 1.
Figure 3:
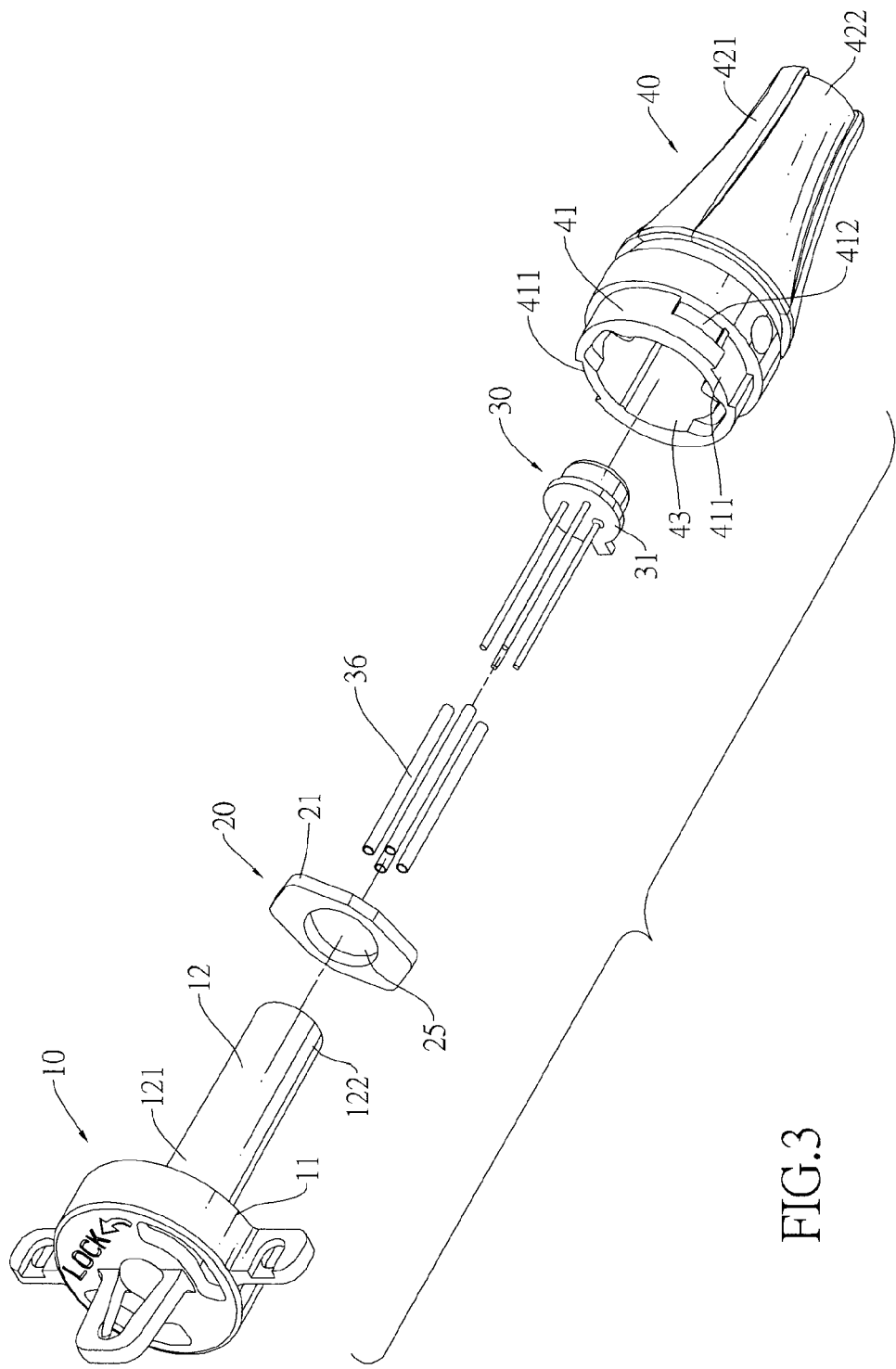
FIG. 3 is another exploded perspective view of the probe in FIG. 1.

With reference to FIGS. 1 to 3 and 5, a first embodiment of a probe for an ear thermometer in accordance with the present invention comprises a mounting bracket (10), a light module (20), a temperature sensor (30) and a probe tube (40).

The mounting bracket (10) has a base (11) and a shaft (12).

The base (11) may be connected to a body of the ear thermometer, may be cylindrical, has an outer surface and a cavity (111) and may further have multiple engaging elements (112). The cavity (111) is defined in the mounting bracket (10) and has an inner surface. The inner surface may be a reflective surface to reflect light. The engaging elements (112) are formed on the inner surface of the cavity (111) and may be engaging protrusions formed on and protruding radially inwardly from the inner surface of the cavity (111).

The shaft (12) is formed on and protrudes longitudinally from the base (11) and may be hollow to allow cables or wires to extend through the shaft (12). The shaft (12) has a proximal end (121) and a connecting end (122). The proximal end (121) is formed on the base (11). The connecting end (122) is defined opposite to the proximal end (121).

Figure 4:
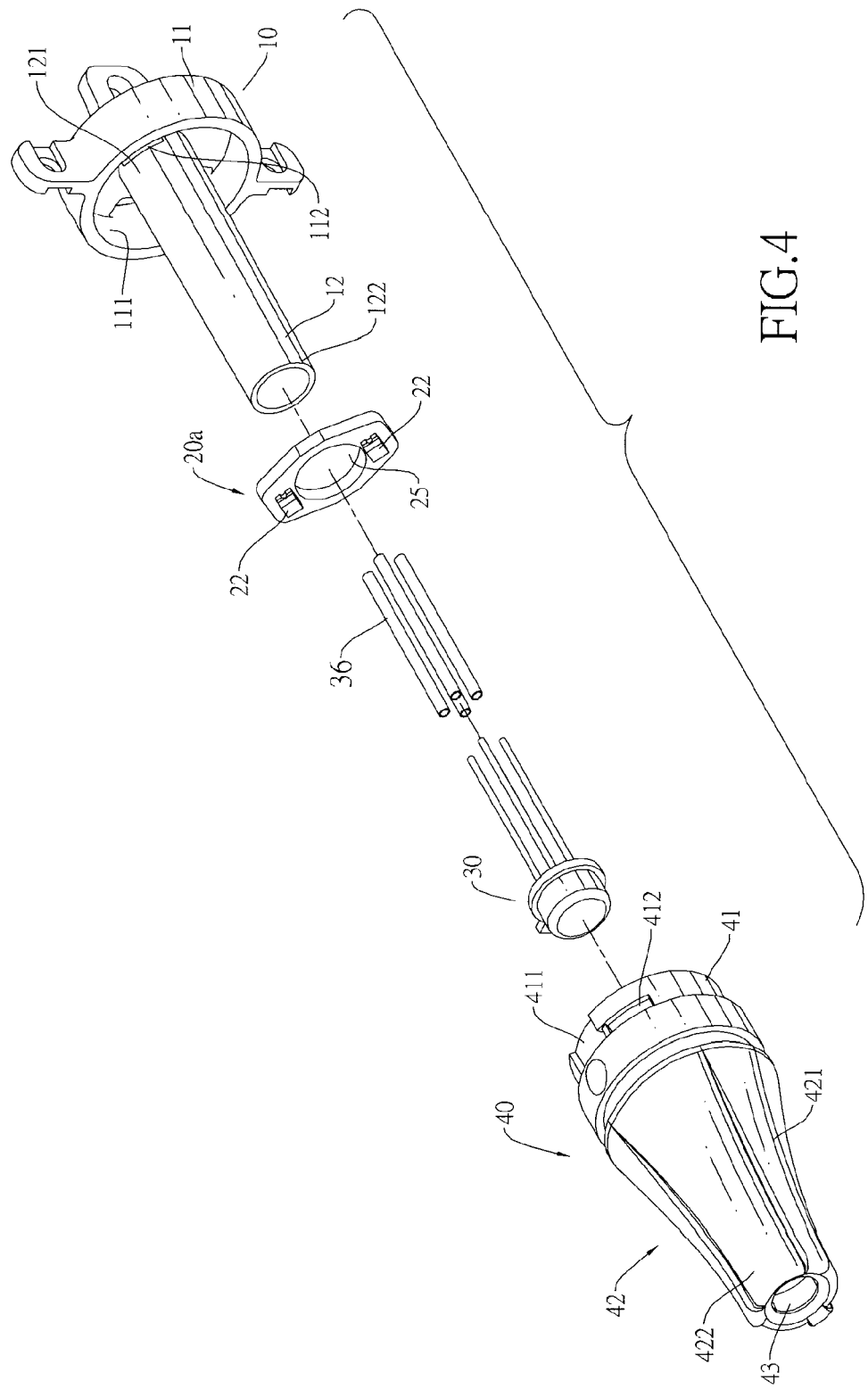
FIG. 4 is a perspective view of the probe in FIG. 1 with multiple LEDs mounted on a printed circuit board.
Figure 5:
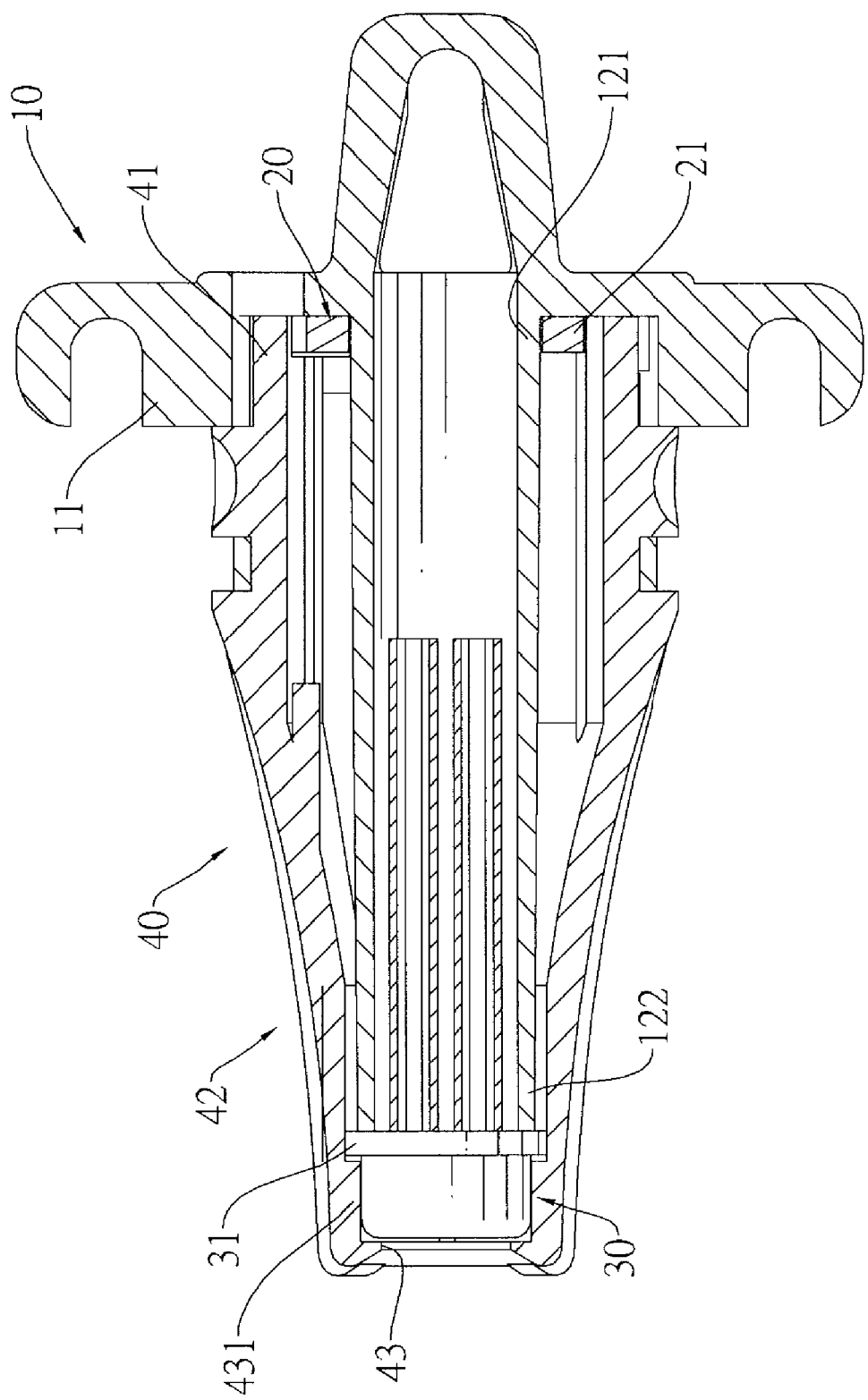
FIG. 5 is a cross sectional side view of the probe in FIG. 1.
Figure 6:
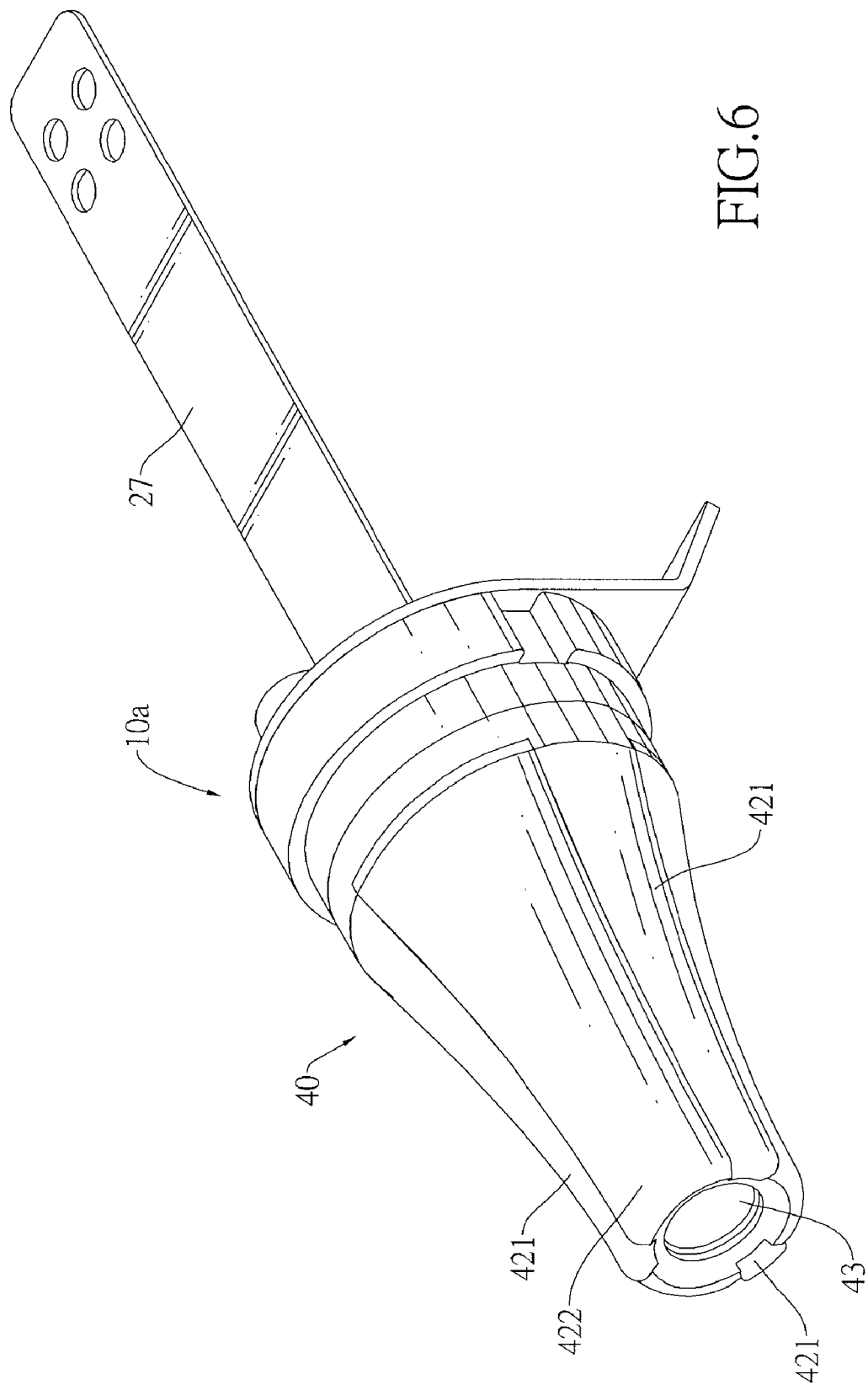
FIG. 6 is a perspective view of a second embodiment of a probe for an ear thermometer in accordance with the present invention.
Figure 7:
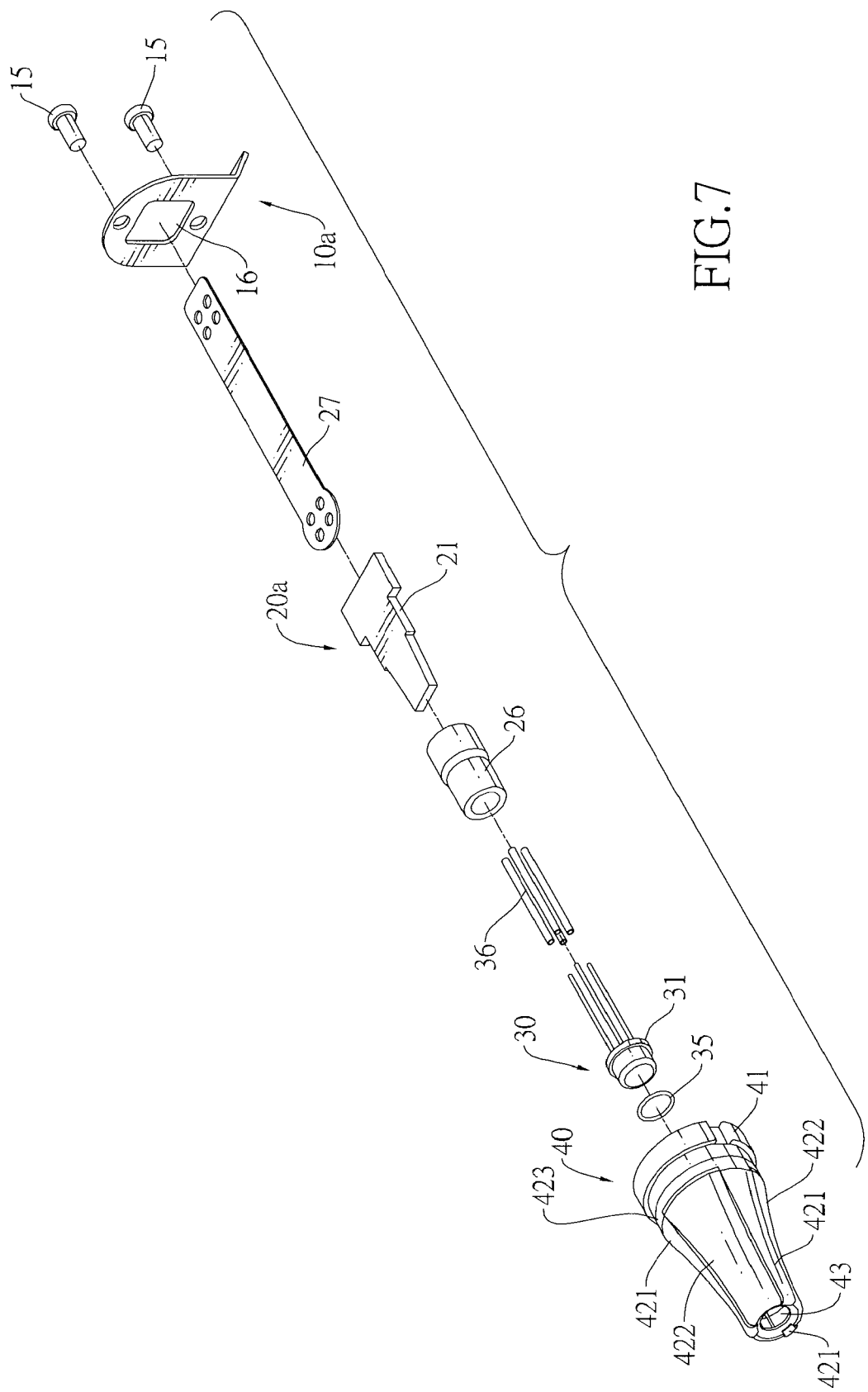
FIG. 7 is an exploded perspective view of the probe in FIG. 6.
Figure 8:
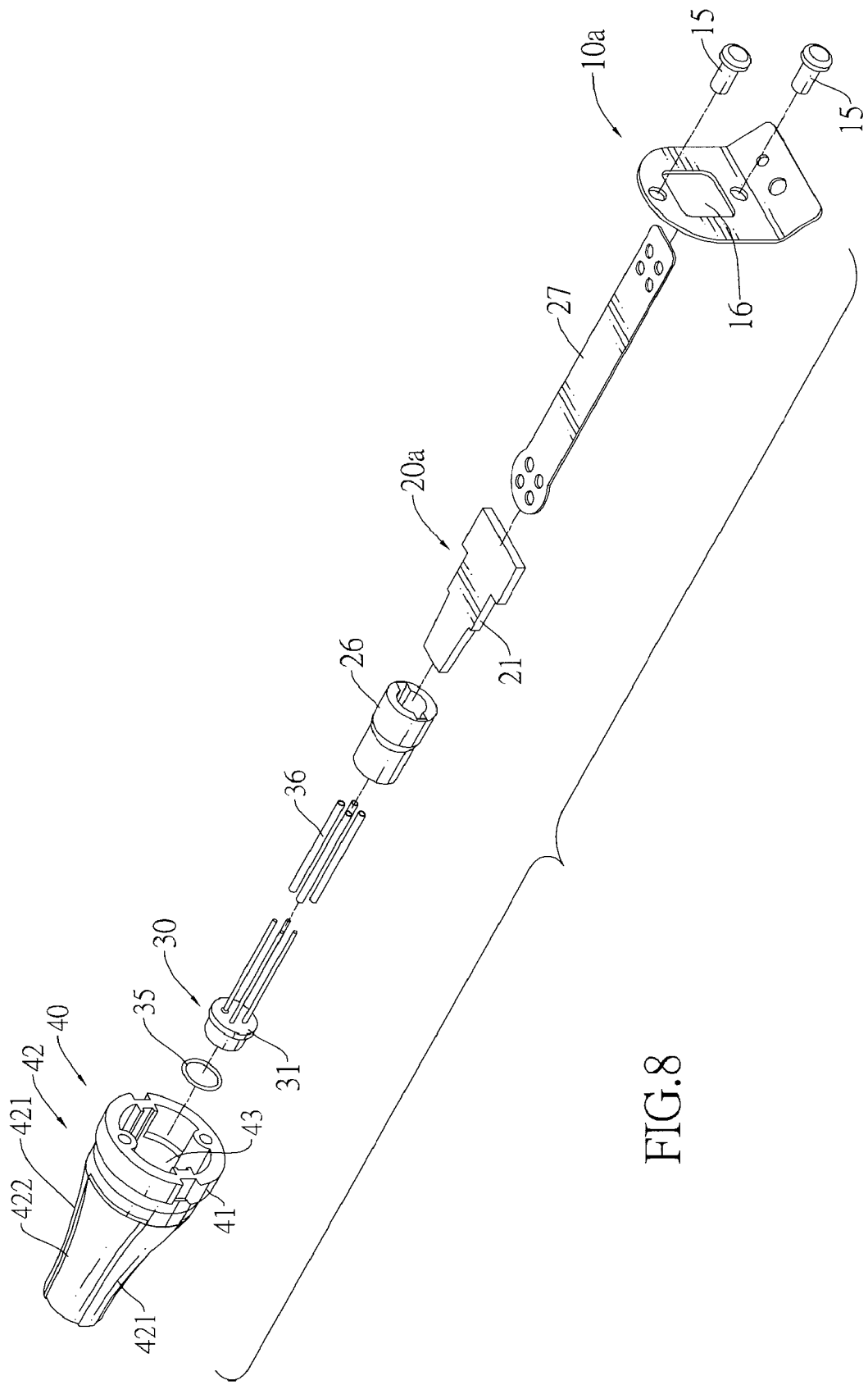
FIG. 8 is another exploded perspective view of the probe in FIG. 6.
Figure 9:
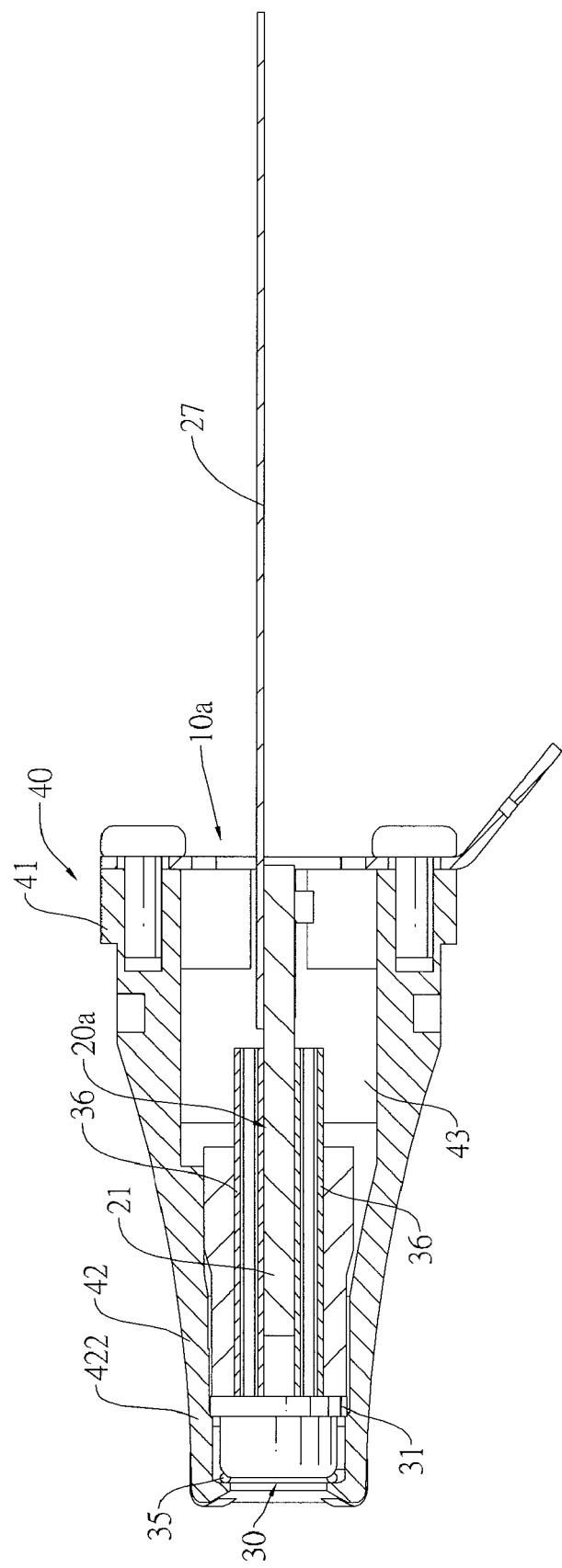
FIG. 9 is a cross sectional side view of the probe in FIG. 6.

The light module (20) is mounted in the cavity (111) and is capable of radiating different colored lights to respectively indicate normal and abnormal body temperatures. For example, the light module (20) is capable of radiating green light to indicate the normal body temperature or red light to indicate abnormal body temperature. The light module (20) may have a printed circuit board (PCB) (21) and at least one light emitting element (22). The PCB (21) is mounted in the cavity (111) and may have a mounting hole (25) defined through the PCB (21) and mounted around the shaft (12). The at least one light emitting element (22) may be at least one light emitting diode (LED), is mounted on the PCB (21) and is capable of radiating light. When a singular LED is implemented, the LED colored is a multi-colored LED that is controlled by a circuit to emit different colored lights. With further reference to FIG. 4, when multiple LEDs are implemented on the circuit board (20a), the LEDs emit different colored lights respectively. The radiated light may be reflected forward by the reflective surface of the cavity (111) of the mounting bracket (10).

In a preferred embodiment, the PCB allows a user to set different temperatures ranges corresponding to the different colored light from the at least one LED. For example, the user may set a temperature range of 35-37° C. corresponding to green light, a temperature range of 37-38.5° C. corresponding to yellow light and a temperature range of 38.5-40° C. corresponding to red light.

The temperature sensor (30) is mounted on the connecting end (122) of the shaft (30) and may have an annular flange (31) and multiple conducting pins.

The annular flange (31) is formed on the temperature sensor (30).

The multiple conducting pins are mounted on the temperature sensor (30) and may be covered respectively by multiple heat-shrinkable tubes (36).

The probe tube (40) is light-pervious, is mounted on the mounting bracket (10), covers the temperature sensor (30) and has a connecting ring (41) and a shell (42).

The connecting ring (41) is mounted on the base (11) of the mounting bracket (10), has an outer surface and may further have multiple engaging members. The multiple engaging members are formed on the outer surface and are selectively engaged respectively with the engaging elements (112) of the base (11) of the mounting bracket (10). The engaging members may be engaging slots defined in the outer surface of the connecting ring (41) corresponding to and selectively engaged respectively with the engaging protrusions of the base of the mounting bracket (10). Each engaging slot has a longitudinal passageway (411) and a transverse locking hole (412). The longitudinal passageway (411) is defined longitudinally in the outer surface and selectively receives a corresponding engaging protrusion. The transverse locking hole (412) is defined in the outer surface, communicates with the longitudinal passageway (411) and is engaged selectively with the corresponding engaging protrusion.

The shell (42) is conical and light-pervious so that light radiated from the light module (20) passes through the shell (42) to indicate a user that the body temperature (ear temperature) is normal or abnormal. The shell (42) prevents the temperature sensor (30) from contacting skin inside an earhole. Contact between the temperature sensor (30) and the skin would improperly effect the measurement of body temperature. The shell (42) is formed on the connecting ring (41) and has a front end, a rear end and a through hole (43) and may have multiple opaque sections (421) and multiple light-pervious sections (422).

The through hole (43) is defined centrally through the shell (42), receives the temperature sensor (30) and the shaft (12), locates the temperature sensor (30) near the front end and has an inner surface and an inner annular shoulder (431). The inner annular shoulder is foamed on and radially protrudes inward from the inner surface of the through hole (43) and abuts the annular flange (31) of the temperature sensor (30) for precisely positioning purposes.

The opaque and light-pervious sections (411, 421) are arranged alternately. The light-pervious sections (422) are translucent or transparent.

Because the probe of the ear thermometer indicates the body temperature by different colored lights, using the ear thermometer with the probe is easy, simple and instinctive when compared to conventional thermometers that use LCD display to show numerical values.

With reference to FIGS. 6 to 9, a second embodiment of a probe for an ear thermometer in accordance with the present invention is similar to the first embodiment and comprises a mounting bracket (10a), a light module (20a), a temperature sensor (30) and a probe tube (40).

The mounting bracket (10a) is a plate, may be made of metal and has a through hole (16) defined through the mounting bracket (10a).

The light module (20a) is mounted through the through hole (16) of the mounting bracket (10a) and is capable of radiating different colored lights to respectively indicate normal and abnormal body temperatures. The light module (20a) has a PCB (21), at least one light emitting element, a bushing (26) and a film circuit board (27). The bushing (26) is mounted on the PCB (21). The film circuit board (27) is connected to the PCB (21) and extends though the through hole (16) of the mounting bracket (10a).

The temperature sensor (30) is mounted on the bushing (26) of the light module (20a) and may have an annular flange (31), multiple conducting pins and multiple heat-shrinkable tubes (36) as described in the first embodiment.

The probe tube (40) is light-pervious, is mounted on the mounting bracket (10a), covers the temperature sensor (30) and has a connecting ring (41) and a shell (42).

The connecting ring (41) is mounted securely on the mounting bracket through fasteners (15).

The shell (42) is formed integrally on the connecting ring (41) and has a front end, a rear end and a through hole (43) and may have multiple opaque sections (421), multiple light-pervious sections (422) and a dirt-proof O-ring (35). The opaque sections (421) are formed integrally on a mounting ring (423) that is mounted around the shell (42). The dirt-proof O-ring (35) is mounted in the through hole (43) and abuts the temperature sensor (30) to prevent the dirt or water from entering in the through hole (43).

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A probe for an ear thermometer comprising:
    a mounting bracket having
        a base having an outer surface and a cavity defined in the base and having an inner surface; and
        a shaft formed on and protruding longitudinally from the base and having a proximal end formed on the base and a connecting end defined opposite to the proximal end;
    a light module mounted in the cavity of the mounting bracket and being capable of radiating different colored lights to respectively indicate normal and abnormal body temperatures;
    a temperature sensor mounted on the connecting end of the shaft; and
    a probe tube being light-pervious, mounted on the mounting bracket, covering the temperature sensor and having
        a connecting ring mounted on the base of the mounting bracket and having an outer surface; and
        a shell being conical and light-pervious and having a front end, a rear end and a through hole defined centrally through the shell, receiving the temperature sensor and the shaft and locating the temperature sensor near the front end.

2. The probe as claimed in claim 1, wherein the light module has
    a PCB mounted in the cavity and having a mounting hole defined through the PCB; and
    at least one light emitting element mounted on the PCB and capable of radiating light.

3. The probe as claimed in claim 2, wherein the at least one lighting emitting element is at least one LED.

4. The probe as claimed in claim 3, wherein
    the base of the mounting bracket further has multiple engaging elements formed on the inner surface of the cavity; and
    the connecting ring of the probe tube further has multiple engaging members formed on the outer surface and selectively engaged respectively with the engaging elements of the base of the mounting bracket.

5. The probe as claimed in claim 4, wherein
    the engaging elements are engaging protrusions protruding radially inwardly from the inner surface of the cavity of the base of the mounting bracket; and
    the engaging members are engaging slots defined in the outer surface of the connecting ring, corresponding to and selectively engaged respectively with the engaging protrusions of the base of the mounting bracket.

6. The probe as claimed in claim 5, wherein each engaging slot has
a longitudinal passageway defined longitudinally in the outer surface of the connecting ring and selectively receiving a corresponding engaging protrusion; and
a transverse locking hole defined in the outer surface, communicating with the longitudinal passageway and engaged selectively with the corresponding engaging protrusion.

7. The probe as claimed in claim 6, wherein the shell has multiple opaque sections and multiple light-pervious sections arranged alternately, and the light-pervious sections is at least translucent.

8. The probe as claimed in claim 2, wherein a singular LED is implemented on the PCB and the LED is multi-colored LED.

9. The probe as claimed in claim 2, wherein multiple LEDs are implemented on the PCB.

10. The probe as claimed in claim 2, wherein the PCB is capable of setting different temperatures ranges corresponding to the different colored light from the at least one LED.

11. The probe as claimed in claim 2, wherein the temperature sensor further has multiple conducting pins mounted on the temperature sensor and covered respectively by multiple heat-shrinkable tubes.

12. A probe for an ear thermometer comprising:
a mounting bracket being a plate and having a through hole defined through the mounting bracket;
a light module mounted through the through hole of the mounting bracket, being capable of radiating different colored lights to respectively indicate normal and abnormal body temperatures and having
a PCB;
at least one light emitting element mounted on the PCB; and
a bushing mounted on the PCB;
a temperature sensor mounted on the PCB of the light module; and
a probe tube being light-pervious, mounted on the mounting bracket, covering the temperature sensor and having
a connecting ring mounted on the mounting bracket and having an outer surface; and
a shell being conical and light-pervious and having
a front end;
a rear end;
a through hole defined centrally through the shell, receiving the temperature sensor and locating the temperature sensor near the front end; and
multiple opaque sections and multiple light-pervious sections arranged alternately, wherein the light-pervious sections are at least translucent and opaque sections are formed integrally on a mounting ring that is mounted around the shell.

13. The probe as claimed in claim 12, wherein the PCB is capable of setting different temperatures ranges corresponding to the different colored light from the at least one LED.

14. The probe as claimed in claim 12, wherein the temperature sensor further has multiple conducting pins mounted on the temperature sensor and covered respectively by multiple heat-shrinkable tube.

* * * * *